United States Patent [19]
Reinhardt

[11] Patent Number: 5,772,868
[45] Date of Patent: Jun. 30, 1998

[54] HYDRAULIC FILTER CIRCUIT WITH PRESSURE MAINTAINING VALVES, BYPASS AND VENT

[75] Inventor: Hans Reinhardt, Bretten, Germany

[73] Assignee: ARGO GmbH fur Fluidtechnik, Germany

[21] Appl. No.: 755,831

[22] Filed: Nov. 26, 1996

Related U.S. Application Data

[63] Continuation of PCT/EP96/00995, Mar. 8, 1996.

[30]     Foreign Application Priority Data

Mar. 29, 1995 [DE]   Germany .......................... 195 11 482.5

[51] Int. Cl.$^6$ .......................... B01D 35/01; B01D 35/143; B01D 35/157
[52] U.S. Cl. .......................... 210/120; 210/130; 210/137; 210/168; 210/472
[58] Field of Search .......................... 184/6.24; 196/46.1; 210/98, 120, 130, 132, 133, 137, 168, 171, 172, 180, 416.4, 416.5, 433.1, 436, 472

[56]             References Cited

U.S. PATENT DOCUMENTS

| | | | |
|---|---|---|---|
| 3,227,279 | 1/1966 | Bokelman | 210/120 |
| 3,996,137 | 12/1976 | Cooper | 210/130 |
| 4,051,031 | 9/1977 | Suzuki | 210/133 |
| 5,334,309 | 8/1994 | Huggett et al. | 210/133 |

FOREIGN PATENT DOCUMENTS

| | | |
|---|---|---|
| 2 291 784 | 6/1976 | France . |
| 1 941 153 | 10/1970 | Germany . |
| 87 00 021 | 2/1987 | Germany . |
| 40 11 913 | 10/1991 | Germany . |

OTHER PUBLICATIONS

H. Reinhardt, "Bypassventil in Hydrofiltern," *Olhydraulik und Pneumatik*, vol. 19, No. 5, 1975, Mainz, Germany, pp. 409–412.

"Hydraulic Filtration," *Hydraulics and Pneumatics*, vol. 31, No. 3, Mar. 1978, Cleveland, USA, pp. 10–21.

*Primary Examiner*—Joseph W. Drodge
*Attorney, Agent, or Firm*—Barry R. Lipsitz; Ralph F. Hoppin

[57]             ABSTRACT

To simplify the venting of a hydraulic circuit comprising a supply of hydraulic fluid, which is made available to a hydraulic consuming device via a pump, and a return filter comprising a filter housing and a filter element for filtering the hydraulic fluid returning from the consuming device in a return line, it is suggested that the return line comprise prior to entering the return filter a first pressure-maintaining valve which allows the return of the hydraulic fluid to the return filter only when a predetermined first pressure value is exceeded, that the return line be connected upstream in relation to the first pressure-maintaining valve to a venting device leading to the atmosphere and to a bypass line which contains a second pressure-maintaining valve and opens into the supply, wherein the second pressure-maintaining valve opens only when a predetermined second pressure value is exceeded and allows the return of the hydraulic fluid past the return filter to the hydraulic fluid supply, wherein the second pressure value is greater than the first pressure value, and that the venting device allows gas to flow out into the atmosphere but prevents the exit of hydraulic fluid.

18 Claims, 4 Drawing Sheets

HYDRAULIC FILTER CIRCUIT WITH PRESSURE MAINTAINING VALVES, BYPASS AND VENT

This application is a continuation of International PCT application Ser. No. PCT/EP96/00995, filed on Mar. 8, 1996.

BACKGROUND OF THE INVENTION

The invention relates to a hydraulic circuit comprising a supply of hydraulic fluid which is made available to a hydraulic consuming device via a pump, and a return filter comprising a filter housing and a filter element for filtering the hydraulic fluid returning from the consuming device in a return line.

Such hydraulic circuits are used in a plurality of applications, in particular for machines actuated by auxiliary personnel, including self-driving machines, such as, e.g., construction machinery or agricultural machinery.

When such hydraulic circuits were put into operation, all the individual components of the hydraulic circuit were previously vented by hand and separately once a hydraulic supply had first been filled into the hydraulic tank. This is a work-intensive procedure which must, in addition, be repeated when the system is started up since gas bubbles which are caught in parts of the circuit to begin with can collect only gradually at the venting locations and be removed.

The object of the present invention is to create a possibility of simplifying the putting into operation of the hydraulic circuit and, in particular, the venting thereby required.

SUMMARY OF THE INVENTION

This object is accomplished in accordance with the invention in that the return line is equipped prior to entering the return filter with a first pressure-maintaining valve which allows the return of the hydraulic fluid to the return filter only when a predetermined first pressure value is exceeded, that the return line is connected on the inflow side in relation to the first pressure-maintaining valve with a venting device leading to the atmosphere and to a bypass line which contains a second pressure-maintaining valve and opens into the supply tank, wherein the second pressure-maintaining valve opens only when a predetermined second pressure value is exceeded and allows the return of the hydraulic fluid past the return filter to the hydraulic fluid supply, whereby the second pressure value is greater than the first pressure value, and that the venting device allows gas to flow out into the atmosphere but prevents the exit of hydraulic fluid.

With this inventive hydraulic circuit it is completely adequate when first of all the hydraulic fluid is filled into the supply tank and the pumps supplying the consuming device in the circuit are switched on. To begin with the pumps convey air or gas still present in the circuit, thereafter a mixture consisting of air and hydraulic fluid and, finally, the pure hydraulic fluid. The air or the mixture of air/hydraulic fluid or the hydraulic fluid as such are conveyed one after the other through the consuming devices and reach the venting device via the return line. As long as amounts of gas are present in the volume conveyed, the venting device allows these to exit to the atmosphere. The first and the second pressure-maintaining valves prevent the gaseous portions of the conveyed volume, which are conveyed to begin with, from being conveyed via the return filter or via the bypass line to the supply tank. This means that the only route remaining for the gas volumina is the route through the venting device. However, as soon as the hydraulic fluid columns arrive at the venting device, i.e. when all the amounts of gas from the hydraulic circuit have been driven out of the circuit as far as the location of the venting device, the venting device closes the connection to the atmosphere. A hydraulic fluid pressure building up in the hydraulic circuit first opens the first pressure-maintaining valve and therefore opens up the path to the return filter. The second pressure-maintaining valve in the bypass line always remains closed during this time. The pressure values, at which these valves open, are, for example, different by a factor of 2 or more. A typical, first pressure value is, for example, at 0.04 bar whereas a typical, second pressure value is at 2 to 2.5 bar.

The second pressure-maintaining valve in its function as a pressure relief valve is not actuated until an increase in pressure takes place at the inflow side of the return filter which normally indicates a contaminated filter element. In order to avoid any overloading of the filter element or rather the hydraulic circuit as a whole, it is provided in this case for the bypass valve (second pressure-maintaining valve) to open and thus create a direct route for the returning hydraulic fluid into the supply tank.

In a preferred embodiment of the hydraulic circuit, a venting device is used which prevents gas from entering the circuit during a vacuum in the circuit.

This means that a pump can also be set into operation already without any problem when the circuit is initially put into operation and this pump is connected with its suction side to the outflow side of the return filter and does not draw the hydraulic fluid directly out of the supply tank.

In this connection, it is particularly advantageous when two pressure-maintaining valves are arranged in antiparallel connection on the outflow side of the return filter, wherein the first pressure-maintaining valve opens the path from the return filter to the supply tank only at a specific pressure on the outflow side. The pressure-maintaining valve which is in antiparallel connection functions as a subsequent suction valve and opens at a pressure value which is preferably considerably smaller than the first pressure value (e.g. 0.01 bar) so that it is possible during the start-up phase for the pump connected to the outflow side of the return filter also to draw in hydraulic fluid from the supply tank. In order to protect the subsequent suction valve, the pump and the consuming device connected thereto from contamination, a valve protection screen is preferably connected upstream of the subsequent suction valve in its connecting line to the supply tank.

The venting device is preferably integrated into a closure means of the filter housing so that practically no additional line paths exist between the return filter and the venting device, in which additional amounts of gas could possibly collect.

It is, in addition, preferably provided for the venting device and the first pressure-maintaining valve to form a constructional unit which can be removed after the venting procedure of the circuit has been completed or rather after the circuit has been put into operation completely.

This allows a state of the hydraulic circuit to be provided which customarily exists for normal operation and the additional flow resistance for the hydraulic fluid in the form of the first pressure-maintaining valve is canceled out for the normal operation.

It is particularly preferred for the constructional unit consisting of venting device and first pressure-maintaining valve to be integrated into the closure means of the filter housing so that the constructional unit is removed as a whole after completion of the run-in procedure and replaced by a normal closure means or cover of the filter housing for normal operation.

Alternatively, it can be provided for the venting device itself to be closable in a permanently gastight manner so that after completion of the run-in procedure and the complete venting of the hydraulic circuit the venting device is closed in a permanently gastight manner for normal operation.

Should it be necessary to exchange the hydraulic fluid or the necessity exist for other reasons of venting the system or rather the hydraulic circuit again, the venting device can be opened again and the venting procedure carried out as described above.

These and additional advantages of the invention are described in the following in greater detail on the basis of the drawings.

DETAILED DESCRIPTION OF THE INVENTION

Figure 1:
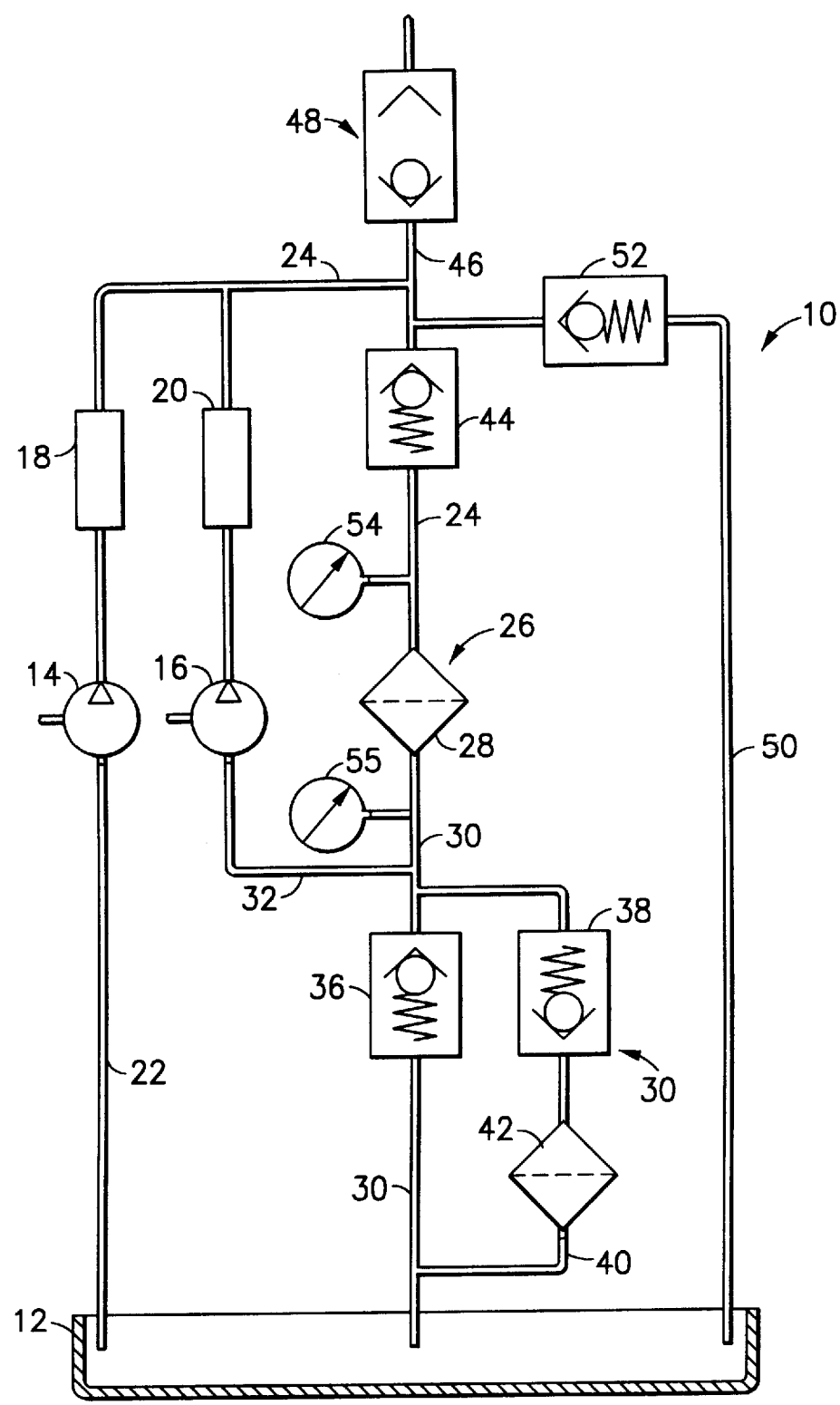
FIG. 1 a block diagram of an inventive hydraulic circuit.

FIG. 1 shows a hydraulic circuit designated as a whole with the reference numeral 10 and comprising a supply tank 12 for hydraulic fluid, pumps 14 and 16 which supply two consuming devices 18 and 20 with hydraulic fluid. In this respect, the pump 14 is directly connected to the supply tank 12 for hydraulic fluid via a suction line 22.

On the outflow side of the consuming devices 18 and 20, the returning hydraulic fluid is brought together in a common return line 24 which leads to a return filter 26 which normally comprises an exchangeable filter element 28. On the outflow side, the return filter 26 is connected to the supply tank 12 with a return line 30. A suction line 32 for supplying the pump 16 with hydraulic fluid branches off the return line 30. Downstream of this branch line, a double pressure-maintaining valve is integrated in antiparallel connection into the return line 30, the double pressure-maintaining valve thereby comprising, on the one hand, a pressure relief valve 36 and a subsequent suction valve 38. The pressure relief valve 36 opens when less hydraulic fluid is required via the pump 16 than reaches the return filter 26 via the return line 24 and thus allows the excess hydraulic fluid to pass to the supply tank 12.

The subsequent suction valve 38 which is in antiparallel connection opens when the amount of hydraulic fluid supplied via the return line 24 is not adequate for the supply of the consuming device 20. In this respect, hydraulic fluid flows directly out of the tank via a branch line 40, which includes a valve protection screen 42, via the subsequent suction valve and the suction line 32 to the pump 16.

On the inflow side in relation to the return filter 26, the return line 24 comprises a pressure-maintaining valve 44. Upstream of the pressure-maintaining valve 44, a tap line 46 branches off from the return line 24 and leads to a venting device 48 which is designed such that it, on the one hand, does not allow any gas to enter the system in the case of a vacuum in the hydraulic circuit and, on the other hand, allows amounts of gas to exit from the circuit in the case of overpressure in the hydraulic circuit. As soon as hydraulic fluid enters the venting device 48, the venting device closes the outlet which is otherwise open to the atmosphere and prevents hydraulic fluid from leaking out.

Likewise upstream of the pressure-maintaining valve 44, a bypass line 50 branches off from the return line 24 and contains a pressure relief valve 52 in the function of a bypass valve. This pressure relief valve 52 opens up a path from the return line 24 via the bypass line 50 to the tank 12 when an increase in pressure on the inflow side of the return filter 26 above the predetermined nominal values occurs so that any damage to the hydraulic circuit, in particular to the return filter or its filter element 28, as well, is avoided.

The degree of contamination of the filter element may be checked on the basis of two pressure measuring devices 54, 55 which together provide an indication concerning the drop in pressure across the filter element, a value which increases greatly when a filter element is contaminated and provides an indication for the necessary change of the filter element.

The manner in which the inventive hydraulic circuit according to FIG. 1 functions will be explained in greater detail in the following on the basis of FIGS. 2 to 4, these FIGS. 2 to 4 each showing different operating states of the hydraulic circuit 10 of FIG. 1.

Figure 2:
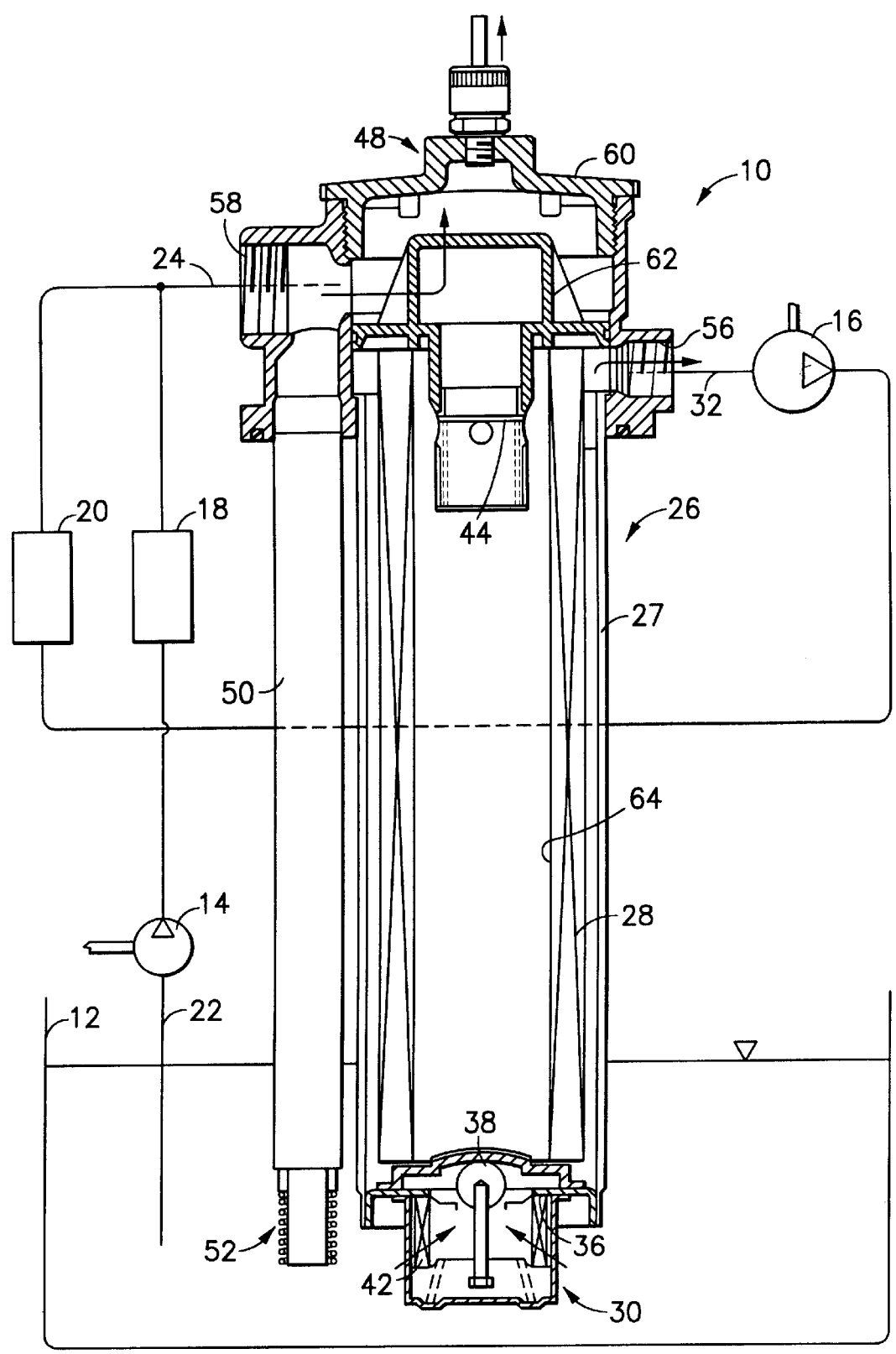
FIG. 2 a sectional view through a return filter with a venting device in an inventive hydraulic circuit.
Figure 3:
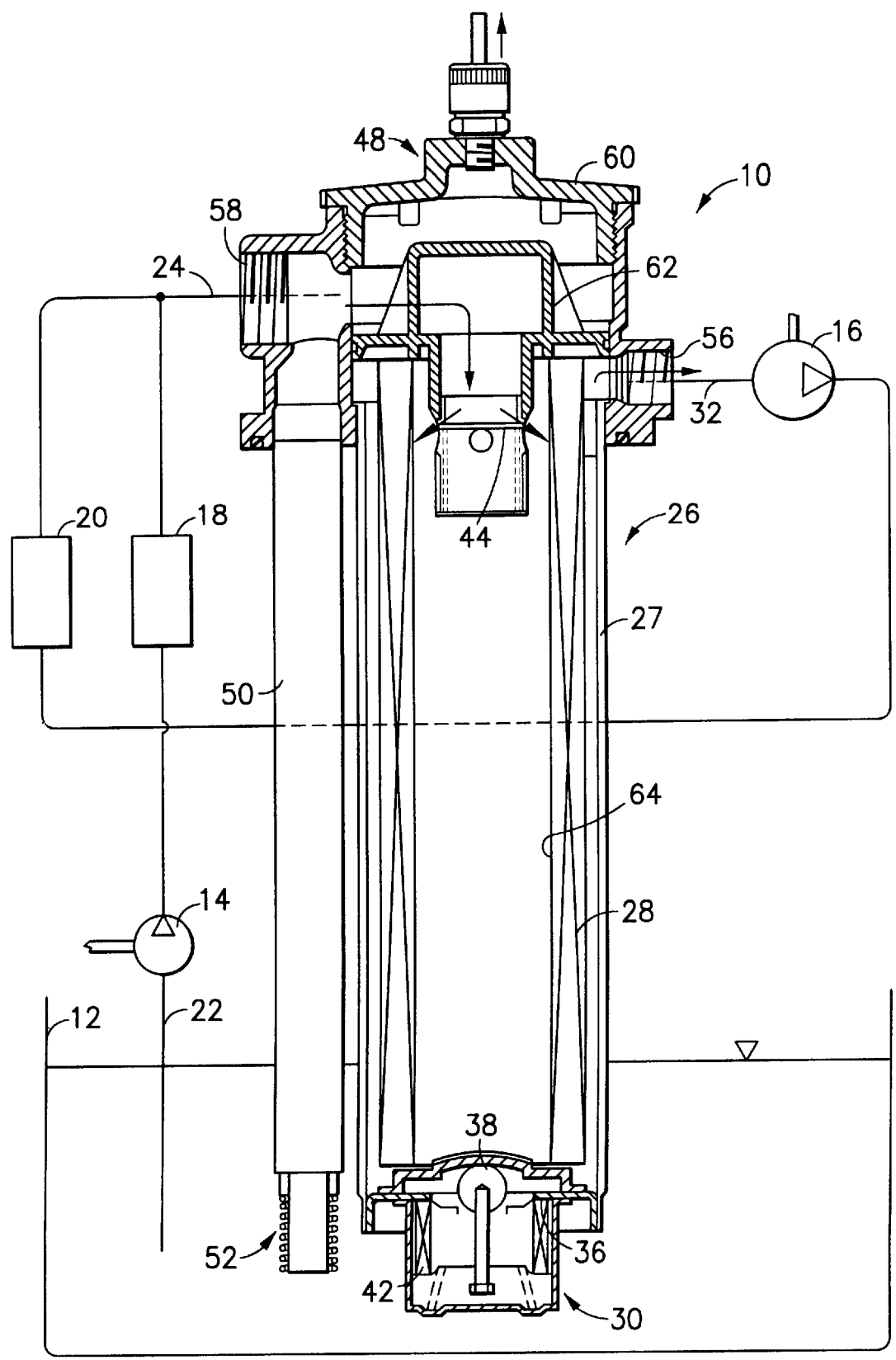
FIG. 3 filter and venting device from FIG. 2 in a further operating state.
Figure 4:
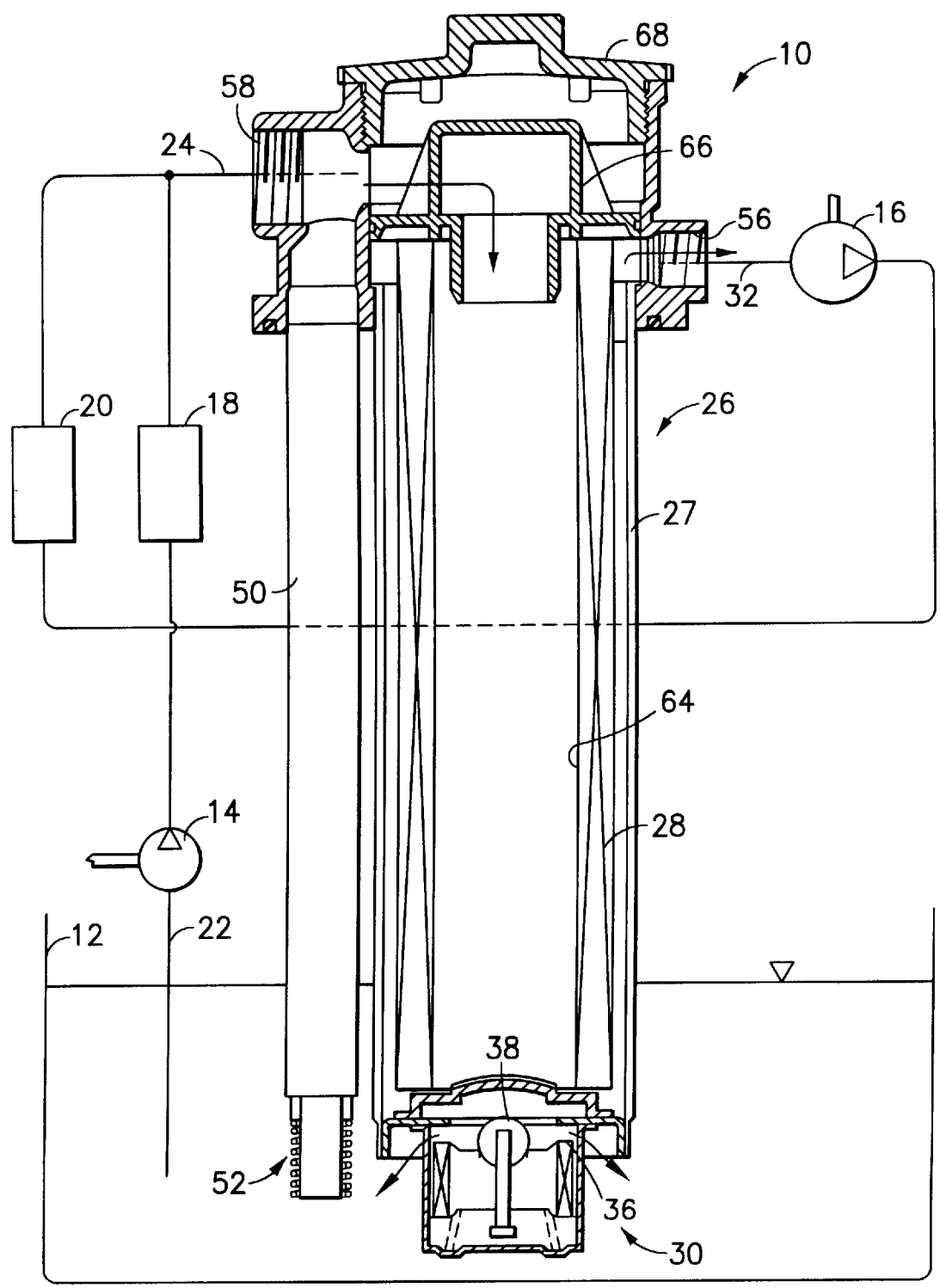
FIG. 4 filter according to FIG. 2 in a further operating state.

FIGS. 2, 3 and 4 show the hydraulic circuit 10 with a detailed illustration of the return filter 26 (illustration in a sectional view) for explaining the manner in which the circuit functions. FIG. 2 thereby contains the first phase while the hydraulic circuit 10 is being put into operation, in which the venting procedure begins. When the system is started, a vacuum results in the suction line of the pump 16 (suction line 32). Under these conditions the subsequent suction valve 38 opens (quiescent point approximately 0.01 bar) and allows hydraulic fluid from the tank 12 to enter a space between the housing 27 of the return filter 26 and the filter element 28 via the branch line 40, the valve protection screen 42 (cf. the arrows in the Figure), whereby the hydraulic fluid fills the clean side of the return filter 26 and rises as far as an outlet 56, from which it then passes into the suction line 32 and from there to the pump 16. The air conveyed to begin with by the pump 16 passes via the associated consuming device 20 and the return line 24 to an inlet 58 of the housing 27 (also called filter head) of the return filter 26, proceeding from which the bypass line 50 with the pressure relief valve 52 branches off in the direction towards the tank 12.

Since the pressure relief valve 52 has a quiescent point of approximately 2.5 bar, this remains closed to begin with so that the volume of gas conveyed by the pump 16 cannot reach the supply tank 12. The pressure-maintaining valve 44, which is arranged in the upper region of the filter element 28 and the inlet side of which is first of all kept closed, has a quiescent point of approximately 0.4 bar. As long as air is flowing into the return filter 26 via the inlet 58, the pressure-maintaining valve 44 still remains closed since the venting device 48 which communicates with the surrounding atmosphere offers practically no resistance to the gas entering or passing through it. The venting device 48 is thereby arranged in a lid 60 of the filter housing 27, the lid sealingly closing the upper open end of the housing 27.

A short intake pipe 62 is arranged in the space beneath the lid 60 and above the filter element 28 and this has the function of separating the mixture of air/hydraulic fluid which is conveyed prior to the pure hydraulic fluid entering the filter housing via the return line 24 so that only the gas components are discharged to the atmosphere via the venting device 48. The short intake pipe 62 thereby has an essentially cylindrical shape and includes impinging surfaces for the fluid components in the mixture of air-fluid. The gas components rise upwards to the lid 60 and are discharged to the atmosphere via the venting device 48 while the fluid components are collected in the short feed pipe to the pressure-maintaining valve 44. As soon as the quiescent point for the pressure-maintaining valve 44 is reached, this opens and allows the hydraulic fluid to enter the interior 64 of the filter element 28.

In the interior of the filter element 68, the hydraulic fluid first of all displaces the volume of gas which is still present there in the space between the filter element 28 and the housing 27 and this is then likewise conveyed via the pump 16, the consuming device 20 into the return line 24, from which it then reaches the short filling pipe 62 via the inlet 58 where the amounts of gas are again discharged to the atmosphere via the venting device 48.

The start-up phase for the pump 14 is less complicated and this already draws hydraulic fluid out of the tank 12 via the suction line 22 after a short time. The amounts of gas present to begin with are conveyed via the consuming device 18 to the return line 24 and from there pass via the short filling pipe 62 to the venting device 48 and to the surrounding atmosphere in the same manner as that described above.

On account of the separating function of the venting device 48, which differentiates between gas and fluid components and merely allows gas components to pass through, it is possible to automatically operate the start-up procedure and so venting of the pumps, the consuming devices, the filter housings etc. no longer has to be carried out by hand.

FIG. 3 shows a phase following directly on from the venting procedure, during which the interior of the filter housing 27 is filled with hydraulic fluid and sufficient pressure is present in the filter housing 27 so that the subsequent suction valve 38 is kept closed. The flow of hydraulic fluid returning via the return line 24 enters the short intake pipe 62 where it is then deflected to the pressure-maintaining valve 44 which opens and allows the flow of hydraulic fluid to exit into the interior 64 of the filter element 28. The hydraulic fluid filtered via the filter element 28 is finally collected in the space between the filter element 28 and the housing wall of the housing 27 and flows to the pump 16 via the outlet 56, the suction line 32.

For the follow-on operation, the lid 60 can be exchanged, just like the short intake pipe 62 which also contains the pressure-maintaining valve 44. The short intake pipe 62 is thereby replaced by a short intake pipe 66 which is of a similar design to the short intake pipe 62 but has at its lower end reaching into the interior 64 of the filter element 28 a free cross section instead of the pressure-maintaining valve 44 secured at this point in the case of the short intake pipe 62. Instead of the lid 60 which includes a venting device integrated therein, a simple closure means 68 is screwed onto the upper end of the housing 27. Due to the exchanging of the short intake pipe 62 for the simplified short intake pipe 66, the flow resistance for the returning hydraulic fluid in the filter housing 27 is minimized.

When the two pumps 14 and 16 run parallel, the returning volume flow via the return line QI+QII is greater than the volume flow QI received by the pump 16 from the clean side of the return filter 26 and so the pressure relief valve 36 is opened via the hydraulic fluid pressure building up in the filter housing 27 and thus a passage out of the housing 27 of the return filter 27 to the supply tank 12 is created for a volume flow QII.

The pressure relief valve 52 does not operate until an increase in pressure occurs on the inlet side of the filter housing 27 (inlet 58) due to a contaminated filter element 28 and this exceeds the quiescent point of the pressure relief valve 52. This then opens in order to prevent any damage to the hydraulic circuit and, in particular, to the filter element 28, as well, and allows the volume flow of hydraulic fluid to enter directly into the supply tank 12 without the hydraulic fluid having to pass through the filter element 28.

What is claimed is:

1. A hydraulic circuit, comprising:

a supply of hydraulic fluid made available to a hydraulic consuming device via a pumps a return filter comprising a filter housing and a filter element for filtering the hydraulic fluid returning from the consuming device in a return line, wherein:

the return line comprises a first pressure-maintaining valve which allows hydraulic fluid to return to the return filter only when a predetermined first pressure value is exceeded;

said first pressure-maintaining valve being disposed in said return line upstream of said return filter;

the return line is connected to a venting device and a bypass line upstream in relation to the first pressure-maintaining valve, said venting device leading to the atmosphere, and said bypass line containing a second pressure-maintaining valve which opens into the supply;

the second pressure-maintaining valve opens only when a predetermined second pressure value is exceeded to allow the return of the hydraulic fluid to the hydraulic fluid supply while bypassing the return filter:

the second pressure value is greater than the first pressure value; and the venting device allows gas to flow out into the atmosphere but prevents the exit of hydraulic fluid.

2. A hydraulic circuit as defined in claim 1, wherein:

the venting device prevents gas from entering the circuit downstream of the filter.

3. A hydraulic circuit as defined in claim 2, wherein:

said first pressure-maintaining valve is disposed in said filter housing; and the venting device and the first pressure-maintaining valve form a constructional unit which is adapted to be removed after venting of the circuit is completed.

4. A hydraulic circuit as defined in claim 2, wherein:

the first pressure-maintaining valve is secured to an inlet to the filter element.

5. A hydraulic circuit as defined in claim 2, wherein:

the venting device is integrated into a closure means of the filter housing.

6. A hydraulic circuit as defined in claim 2, wherein:

the venting device is adapted to be closed in a permanently gastight manner.

7. A hydraulic circuit as defined in claim 1, wherein:

said first pressure-maintaining valve is disposed in said filter housing; and the venting device and the first pressure-maintaining valve form a constructional unit which is adapted to be removed from the filter housing after venting of the circuit is completed.

8. A hydraulic circuit as defined in claim 7, wherein:

the constructional unit is integrated into a closure means of the filter housing of the return filter.

9. A hydraulic circuit as defined in claim 8, wherein:

the venting device is adapted to be closed in a permanently gastight manner.

10. A hydraulic circuit as defined in claim 7, wherein:

the venting device is adapted to be closed in a permanently gastight manner.

11. A hydraulic circuit as defined in claim 1, wherein:

the first pressure-maintaining valve is secured to an inlet to the filter element.

12. A hydraulic circuit as defined in claim 11, wherein:

the venting device is integrated into a closure means of the filter housing.

13. A hydraulic circuit as defined in claim 11, wherein:

the venting device is adapted to be closed in a permanently gastight manner.

14. A hydraulic circuit as defined in claim 1, wherein:

the venting device is integrated into a closure means of the filter housing.

15. A hydraulic circuit as defined in claim 14, wherein:

the venting device is adapted to be closed in a permanently gastight manner.

16. A hydraulic circuit as defined in claim 1, wherein:

the venting device is adapted to be closed in a permanently gastight manner.

17. A hydraulic circuit as defined in claim 1, wherein:

said first pressure-maintaining valve is disposed in said filter housing; and the first pressure maintaining valve is adapted to be removed from the filter housing after venting of the circuit is completed.

18. A hydraulic circuit as defined in claim 1, wherein:

said first pressure-maintaining valve is disposed in said filter housing; and the venting device and the first pressure-maintaining valve are adapted to be removed from the filter housing after venting of the circuit is completed.

* * * * *